US009453457B2

(12) United States Patent
Owens

(10) Patent No.: US 9,453,457 B2
(45) Date of Patent: Sep. 27, 2016

(54) HYDROGEN SUPPLEMENTAL SYSTEM FOR ON-DEMAND HYDROGEN GENERATION FOR INTERNAL COMBUSTION ENGINES

(71) Applicant: HNO GreenFuels, Inc., Temecula, CA (US)

(72) Inventor: Donald W. Owens, Temecula, CA (US)

(73) Assignee: HNO Green Fuels, Inc., Temecula, CA (US)

( * ) Notice: Subject to any disclaimer, the term of this patent is extended or adjusted under 35 U.S.C. 154(b) by 28 days.

(21) Appl. No.: 13/922,351

(22) Filed: Jun. 20, 2013

(65) Prior Publication Data

US 2013/0276726 A1    Oct. 24, 2013

Related U.S. Application Data

(63) Continuation-in-part of application No. 13/842,102, filed on Mar. 15, 2013, which is a continuation-in-part of application No. 13/224,338, filed on Sep. 2, 2011, now Pat. No. 8,449,754, which is a (Continued)

(51) Int. Cl.
*F02B 43/08* (2006.01)
*F02B 43/10* (2006.01)
(Continued)

(52) U.S. Cl.
CPC ............. *F02B 43/10* (2013.01); *C25B 1/04* (2013.01); *C25B 15/02* (2013.01); *C25B 15/08* (2013.01);
(Continued)

(58) Field of Classification Search
CPC .......... F02B 43/10; F02B 1/04; F02B 43/08; F02M 27/02; F02M 25/12

USPC ............................................................ 123/3
See application file for complete search history.

(56) References Cited

U.S. PATENT DOCUMENTS 3,252,455 A    5/1966   Marshall
3,433,729 A    3/1969   Mikhailovich et al.
(Continued)

FOREIGN PATENT DOCUMENTS

DE    19504142      8/1995
WO    2009018814    2/2009
WO    2011150322    12/2011

OTHER PUBLICATIONS

J. Russell, et al "Hydrogen Generation by Solid Polymer Electrolyte Water Electrolysis", American Chemical Society, Chicago Symposium 1973, pp. 24-40.

(Continued)

*Primary Examiner* — Lindsay Low
*Assistant Examiner* — Charles Brauch
(74) *Attorney, Agent, or Firm* — Wagenknecht IP Law Group PC

(57) ABSTRACT

A portable on-demand hydrogen supplemental system is provided for producing hydrogen gas and injecting the hydrogen gas into the air intake of internal combustion engines. Hydrogen and oxygen is produced by an electrolyzer from nonelectrolyte water in a nonelectrolyte water tank. The hydrogen gas is passed through a hydrogen gas collector. Nonelectrolyte water mixed with the hydrogen gas in the hydrogen gas collector is passed back thru the tank for distribution and water preservation. The system can be powered by the vehicles alternator, a standalone battery, waste heat or solar energy. The system utilizes an onboard diagnostic (OBD) interface in communication with the vehicle's OBD terminal, to regulate power to the system so that hydrogen production for the engine only occurs when the engine is running. The hydrogen gas is produced it is immediately consumed by the engine. No hydrogen is stored on, in or around the vehicle.

36 Claims, 12 Drawing Sheets

Related U.S. Application Data continuation-in-part of application No. 12/790,398, filed on May 28, 2010, now Pat. No. 8,499,722.

(60) Provisional application No. 61/313,919, filed on Mar. 15, 2010.

(51) Int. Cl.

| | |
|---|---|
| *C25B 15/02* | (2006.01) |
| *C25B 15/08* | (2006.01) |
| *C25B 1/04* | (2006.01) |
| *F02M 25/12* | (2006.01) |
| *F02M 27/02* | (2006.01) |
| *F02B 1/04* | (2006.01) |

(52) U.S. Cl.
CPC ............... *F02M 25/12* (2013.01); *F02B 1/04* (2013.01); *F02B 43/08* (2013.01); *F02M 27/02* (2013.01); *Y02E 60/366* (2013.01); *Y02E 70/10* (2013.01); *Y02P 20/129* (2015.11); *Y02P 20/134* (2015.11); *Y02T 10/121* (2013.01); *Y02T 10/16* (2013.01); *Y02T 10/32* (2013.01)

(56) References Cited

U.S. PATENT DOCUMENTS

| | | | |
|---|---|---|---|
| 4,025,405 A | 5/1977 | Dotson et al. | |
| 4,031,865 A | 6/1977 | Dufour | |
| 4,271,793 A | 6/1981 | Valdespino | |
| 4,368,696 A | 1/1983 | Reinhardt | |
| 5,272,871 A | 12/1993 | Oshima et al. | |
| 5,711,865 A | 1/1998 | Caesar | |
| 5,810,977 A * | 9/1998 | Annecharico et al. | 203/10 |
| 6,033,549 A | 3/2000 | Peinecke et al. | |
| 6,257,175 B1 | 7/2001 | Mosher et al. | |
| 6,688,120 B2 | 2/2004 | Aoki et al. | |
| 7,021,249 B1 | 4/2006 | Christison | |
| 7,143,722 B2 | 12/2006 | Ross | |
| 7,458,368 B1 | 12/2008 | Huffman | |
| 7,552,702 B2 | 6/2009 | Stone | |
| 8,449,733 B2 | 5/2013 | Owens | |
| 8,449,734 B2 | 5/2013 | Owens | |
| 8,449,735 B2 | 5/2013 | Owens | |
| 8,449,736 B2 | 5/2013 | Owens | |
| 8,454,808 B2 | 6/2013 | Owens | |
| 2004/0013918 A1 | 1/2004 | Merida-Donis | |
| 2004/0025808 A1 | 2/2004 | Cheng | |
| 2004/0203166 A1 | 10/2004 | Sullivan | |
| 2005/0229872 A1 | 10/2005 | Lange | |
| 2006/0260562 A1 * | 11/2006 | Otterstrom et al. | 123/3 |
| 2007/0151865 A1 | 7/2007 | Shimko et al. | |
| 2007/0205111 A1 | 9/2007 | Bayliss | |
| 2007/0209608 A1 | 9/2007 | Rutledge | |
| 2007/0259220 A1 | 11/2007 | Redmond | |
| 2008/0257751 A1 | 10/2008 | Smola et al. | |
| 2009/0188240 A1 | 7/2009 | Suzuki et al. | |
| 2009/0283402 A1 | 11/2009 | Osman | |
| 2010/0012090 A1 | 1/2010 | Lewis | |
| 2010/0183931 A1 | 7/2010 | Hedman | |
| 2010/0236921 A1 | 9/2010 | Yang | |
| 2010/0275858 A1 | 11/2010 | Jeffs et al. | |
| 2011/0048961 A1 | 3/2011 | Smedley | |
| 2011/0290201 A1 | 12/2011 | Owens | |
| 2012/0055422 A1 | 3/2012 | Owens | |
| 2012/0073521 A1 | 3/2012 | Owens | |
| 2012/0073522 A1 | 3/2012 | Owens | |
| 2012/0073523 A1 | 3/2012 | Owens | |
| 2012/0073524 A1 | 3/2012 | Owens | |
| 2012/0073525 A1 | 3/2012 | Owens | |

OTHER PUBLICATIONS

C. Kim et al, "Hydrogen Production from Water Using Polymer Electrolyte Membrane", American Institute of Chemical Engineers, Nov. 7, 2004.

I. Papagiannakis, "Studying and Improving the Efficiency of Water Electrolysis using a Proton Exchange Membrane", Thesis Submitted to Strathclyde University, 2005.

* cited by examiner

HYDROGEN SUPPLEMENTAL SYSTEM FOR ON-DEMAND HYDROGEN GENERATION FOR INTERNAL COMBUSTION ENGINES

CROSS-REFERENCE TO RELATED APPLICATIONS

This is a continuation-in-part application of U.S. application Ser. No. 13/842,102, filed on Mar. 15, 2013, which is a continuation-in-part application of U.S. application Ser. No. 13/224,338, filed Sep. 2, 2011, now U.S. Pat. No. 8,449,736; which is a continuation-in-part application of U.S. application Ser. No. 12/790,398, filed May 28, 2010; which is a non-provisional of application Ser. No. 61/313,919, filed Mar. 15, 2010, the contents of which are incorporated herein by reference.

BACKGROUND OF THE INVENTION

1. Field of the Invention

The present invention relates to hydrogen generation devices. More particularly, the present invention relates to a portable hydrogen supplemental system that can be used with internal combustion engines for increased fuel efficiency and reduced carbon emissions.

2. Description of the Related Art

There are a number of devices on the market that create HHO gas, otherwise known as Brown's gas, which is used as a supplement to gasoline and diesel engines. HHO gas consists of two parts hydrogen to one part oxygen. These devices typically comprise an electrolyzer which decomposes water into hydrogen and oxygen. An example is U.S. Pat. No. 3,368,696. The electrolyzer typically uses an electrolyte, most notably KOH, Potassium hydroxide, or baking soda. A voltage is placed across the device to produce the HHO gas.

The main problem with HHO systems is that they produce hydrogen and oxygen in a combined gas stream. The hydrogen and oxygen gases are not generally separated from each other. In the case of modern gasoline powered vehicles, this extra oxygen is detected by the vehicle's oxygen sensors which communicate this extra oxygen level to an on-board computer, namely an Electronic Control Unit (ECU) of the vehicle. When the ECU detects this extra oxygen, it is a signal that the engine is running lean and the ECU adds more gasoline to the engine. This also negates most of the fuel efficiency gains. Also, the energy required to produce the hydrogen can create a substantial load on the electrical system of the vehicle if not regulated properly. Similar to running the air conditioner in any vehicle, the additional electrical load causes the miles per gallons to be reduced. Even though the hydrogen typically boosts the efficiency and miles per gallon of the vehicle, the additional electrical load on the vehicle to create the hydrogen is usually great enough to minimize or in many cases negate most or all of mileage gains of the vehicle, depending upon the vehicle's alternator output.

Exhaust emissions are becoming an issue due to environmental concerns. Internal combustion engines are inherently inefficient. In an internal combustion engine, 100% of the fuel that goes into the combustion chamber is not burned during the combustion process for neither gasoline nor diesel engines. The exhaust for all internal combustion engines includes carbon monoxide, unburned hydrocarbons and oxides of nitrogen. For gasoline engines, a catalytic converter is used to convert some of the toxic by-products of the combustion to less toxic substances by way of catalysed chemical reactions. The combustion process in diesel engines is different from that of gasoline engines. Gasoline engines use a spark plug to initiate the combustion of gasoline whereas diesel engines use compression to initiate the combustion of the diesel fuel. Because of the difference in the combustion process of diesel engines, the exhaust from diesel engines also contains a mixture of gases and very small particles that can create a health hazard when not properly controlled. Diesel particulate matter is a part of a complex mixture that makes up diesel exhaust.

Diesel exhaust is composed of two phases either gas or particle and both phases contribute to the risk. The gas phase is composed of many of the urban hazardous air pollutants, such as acetaldehyde, acrolein, benzene, 1,3-butadiene, formaldehyde and polycyclic aromatic hydrocarbons. The particle phase also has many different types of particles that can be classified by size or composition. The size of diesel particulates that are of greatest health concern are those that are in the categories of fine, and ultrafine particles. The composition of these fine and ultrafine particles may be composed of elemental carbon with adsorbed compounds such as organic compounds, sulfate, nitrate, metals and other trace elements. Diesel exhaust is emitted from a broad range of diesel engines; the on-road diesel engines of trucks, buses and cars and the off-road diesel engines that include locomotives, marine vessels and heavy duty equipment.

The current technology to reduce particulate matter is either particulate exhaust filters or exhaust systems that attempt to burn the particulate matter once it reaches the exhaust. The use of exhaust filters may require active monitoring to determine whether the exhaust filters have reached their maximum capacity. Further, the exhaust systems that burn the particulate matter are typically complex and expensive system.

SUMMARY OF THE INVENTION

The present invention relates to a portable and compact, on-demand hydrogen supplemental system for producing hydrogen gas and injecting the hydrogen gas into the air intake of internal combustion engines, for vehicles and other applications. Hydrogen and oxygen is produced by an electrolyzer at low temperatures and pressure from nonelectrolyte water in a nonelectrolyte water tank. The hydrogen gas is passed through a hydrogen gas collector. Nonelectrolyte water mixed with the hydrogen gas in the hydrogen gas collector is passed back through the nonelectrolyte water tank for distribution and water preservation. Nonelectrolyte water mixed with the oxygen gas produced by the electrolyzer is also passed back through the nonelectrolyte water tank. The hydrogen gas and the oxygen gas travel in separate directions, therefore the gases are kept separate. In the case of gasoline or diesel engines, the hydrogen gas is directed to the air intake of the engine while the oxygen gas is returned to the nonelectrolyte water tank to be vented to the atmosphere. The system can be powered by the vehicles alternator, a standalone battery, waste heat or solar energy. The system utilizes an engine sensor or an onboard diagnostic (OBD) interface in communication with the vehicle's OBD terminal, to regulate power to the system and therefore hydrogen production for the engine only occurs when the engine is running. Therefore, as the hydrogen gas is produced it is immediately consumed by the engine. No hydrogen is stored on, in or around the vehicle.

Particulate matter emissions can be reduced to nearly zero when the proper amount of hydrogen is employed to burn the fuel more efficiently in the combustion chamber. Utilizing this methodology, particulate matter reduction or elimination can be accomplished with both old and new diesel engines with the use of hydrogen.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a hydrogen supplemental system used to increase the fuel efficiency and reduce carbon emissions for internal combustion engines. The present invention provides various embodiments as described below. However it should be noted that the present invention is not limited to the embodiments described herein, but could extend to other embodiments as would be known or as would become known to those skilled in the art.

Figure 1:
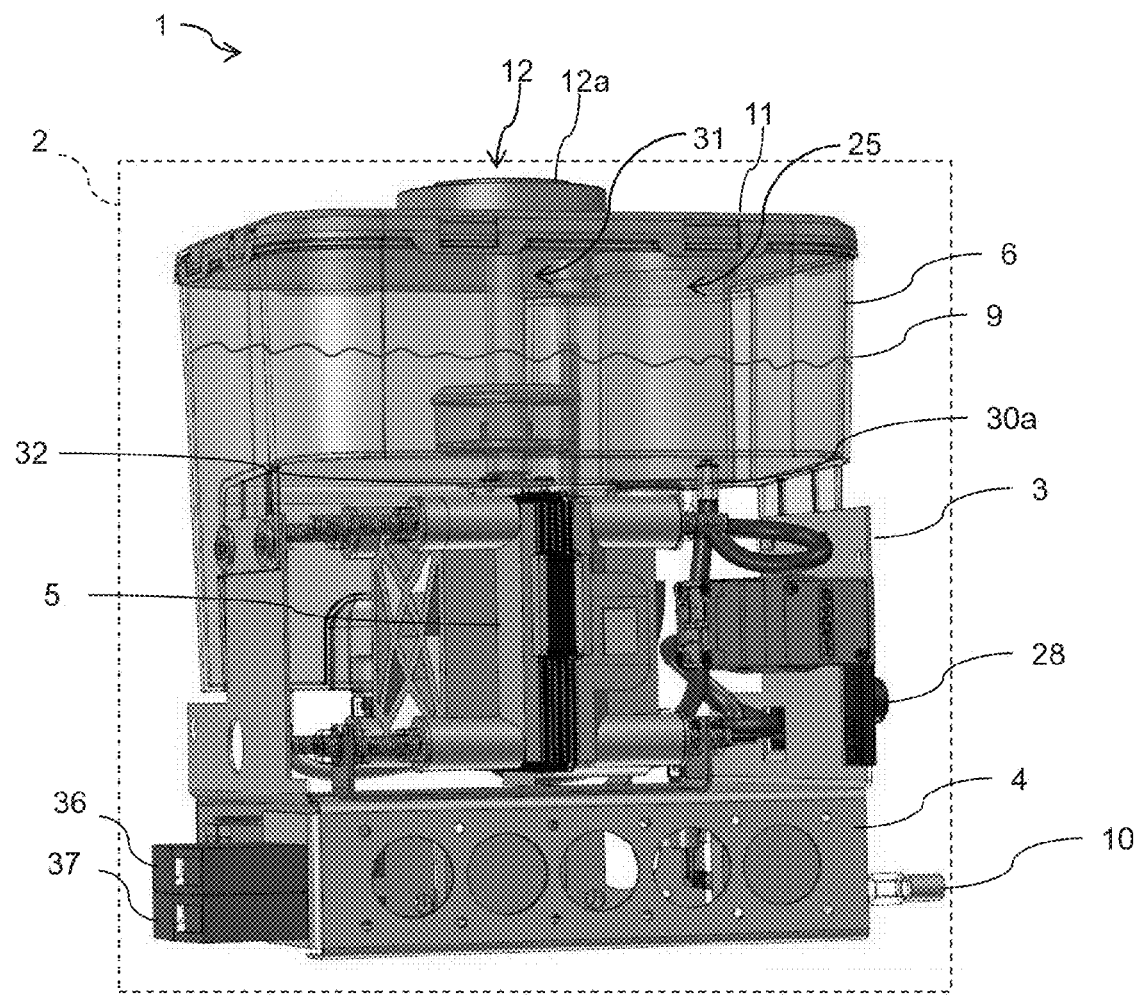
FIG. 1 is a detailed drawing of a front view of a portable hydrogen supplemental system showing a water tank and other components of an interior housing design according to the present invention.

Various components of a portable hydrogen supplemental system 1 are discussed below with reference to FIGS. 1 through 4. The present invention as shown in FIG. 1 provides the portable hydrogen supplemental system 1 which includes a housing unit 2 as outlined via the dashed line shown, that can be secured in the trunk or other flat surface of a vehicle by mounting brackets and fastening units. Inside the housing unit 2 are an electrolyzer 5 and a nonelectrolyte water tank 6 positioned above the electrolyzer 5. The nonelectrolyte water tank 6 is configured to receive nonelectrolyte water 9 therein from an external water source (not shown) via an external water supply connector 10, for supplying the nonelectrolyte water 9 to the electrolyzer 5. The nonelectrolyte water tank 6 is arranged above the electrolyzer 5, in such a manner as to supply the nonelectrolyte water 9 to the electrolyzer 5 by gravity. The nonelectrolyte water tank 6 is supported in the housing unit 2 above the electrolyzer 5 by support 3. The housing unit 2 further includes a separate sub-housing assembly 4 for housing electrical components of the portable hydrogen supplemental system 1. The housing unit 2 is designed to be readily removable from the vehicle.

Figure 2:
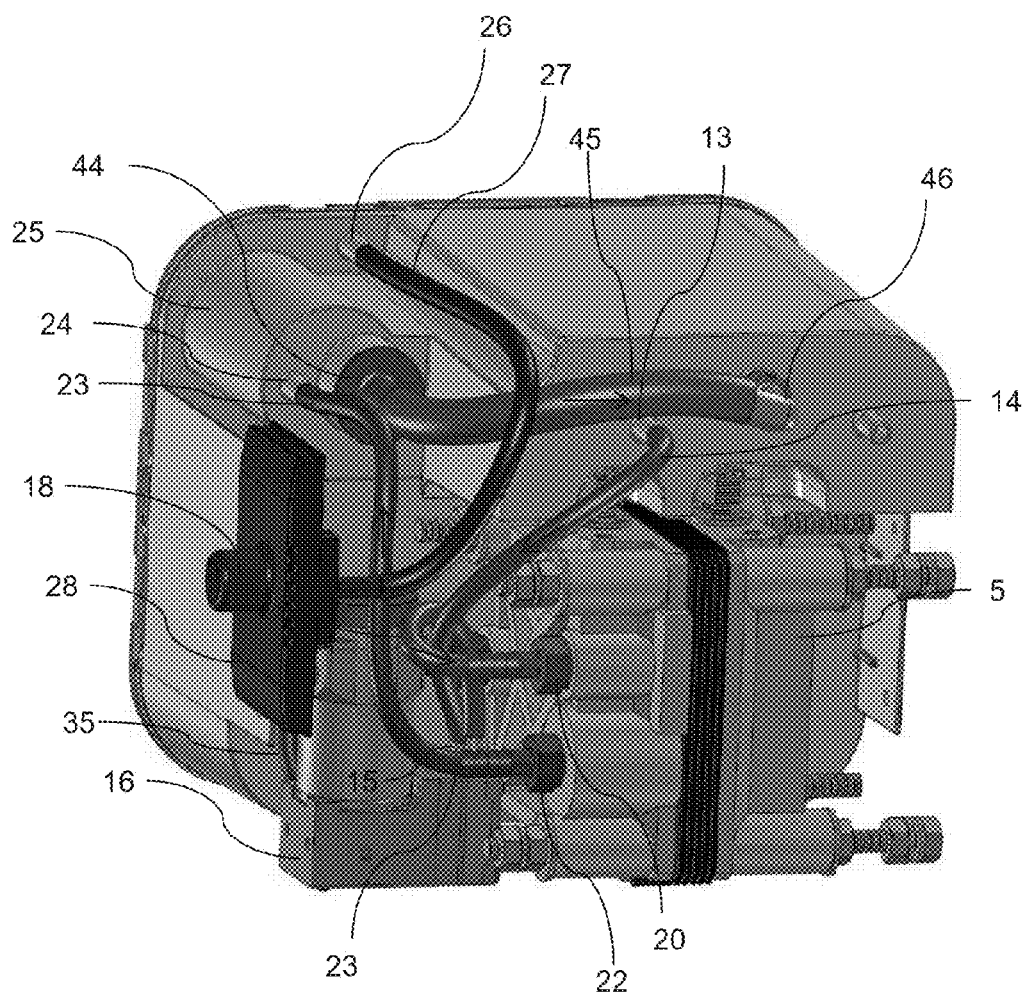
FIG. 2 is a detailed drawing of a bottom side view of the portable hydrogen supplemental system according to the present invention.
Figure 3:
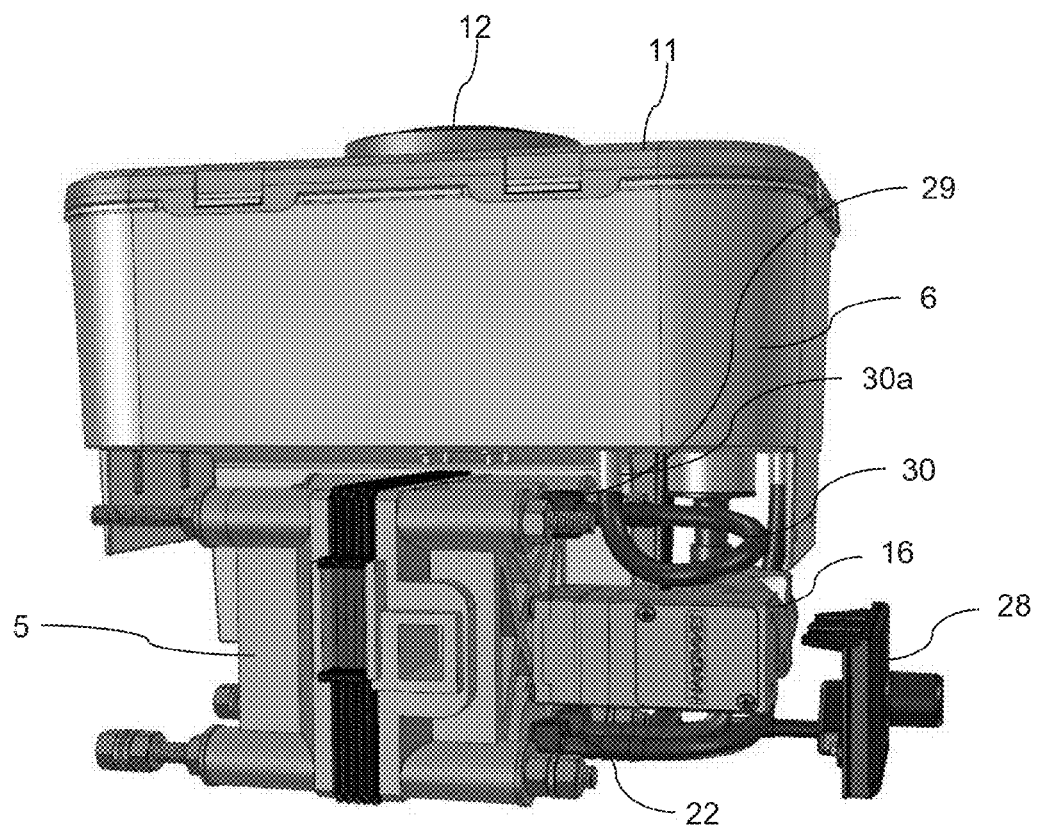
FIG. 3 is a detailed drawing of a rear side view of the portable hydrogen supplemental system according to the present invention.

The nonelectrolyte water tank 6 includes a cover 11 covering a top surface of the nonelectrolyte water tank 6, the cover 11 including a fill spout 12 and spout cover 12a at a top portion thereof for receiving nonelectrolyte water 9 in the nonelectrolyte water tank 6 and filling the nonelectrolyte water tank 6, and a water supply fitting 13 (as shown in FIG. 2) positioned on a rear side of the nonelectrolyte water tank 6 connected to a tube or other supply means 14 that is in turn connected to a water inlet fitting 15 on a pump device 16 for pumping the nonelectrolyte water 9 into the electrolyzer 5. It should be noted that the pump device 16 is provided to maintain a predetermined water pressure of the nonelectrolyte water 9 being supplied to the electrolyzer 5. However, if the water pressure is not an issue, the pump device 16 is an optional element. Nonelectrolyte water 9 is then supplied to the electrolyzer 5 by a tube or other supply 18 connected to the electrolyzer 5 via a connector means 20. The electrolyzer 5 decomposes nonelectrolyte water 9 into hydrogen gas $H_2$ and oxygen gas $O_2$ when received from the nonelectrolyte water tank 6. The electrolyzer 5 also includes a hydrogen gas outlet fitting 22 (as depicted in FIG. 2) connected via tubes or additional supply means 23 and a fitting 24, to a hydrogen gas collector 25 formed at a rear side of the nonelectrolyte water tank 6. Details of the hydrogen gas collector 25 will be discussed below with reference to FIGS. 7 and 8A-8D. Hydrogen gas collected within the hydrogen gas collector 25 is disbursed to the internal combustion engine (i.e., a diesel engine) via a hydrogen outlet fitting 26 and a supply means or other tubing 27, to a hydrogen outlet 28 disposed at a perimeter of the portable hydrogen supplemental system 1. For example, as shown in FIG. 1, according to one embodiment, the hydrogen outlet 28 may be formed below the pump device 16. Oxygen gas and water mixture generated from the electrolyzer 5 is sent to the nonelectrolyte water tank 6 via an oxygen outlet fitting 29 of the electrolyzer 5 and a supply means or other tubing 30 to a tank fitting 30a as shown in FIG. 3.

Referring back to FIG. 1, the nonelectrolyte water tank 6 further includes a float assembly 31 configured to perform a floating operation indicative of a level of the nonelectrolyte water 9 within the nonelectrolyte water tank 6. Details of the operation of the float assembly 31 will be discussed below with reference to FIGS. 6A and 6B. A water level sensor 32 is also provided at a bottom surface of the nonelectrolyte water tank 6, and is configured to magnetically communicate with the float assembly 31, to determine the level of the nonelectrolyte water 9. A temperature sensor may also be provided. The temperature sensor may be mounted within the nonelectrolyte water tank 6 or any suitable location within the housing 2 and be configured to sense a temperature of the nonelectrolyte water 9. A heater may further be provided along a surface of the electrolyzer 5, mounted to a sub-housing assembly or any other suitable location within the housing 2, and configured to heat the nonelectrolyte water 9 when it is detected via the temperature sensor that the nonelectrolyte water 9 has dropped below a predetermined temperature (e.g., 32 degrees). The nonelectrolyte water tank 6 may also include a tank vent port (not shown) for releasing oxygen gas within the nonelectrolyte water tank 6 via a tube or other venting means (e.g. in the fill spout cover 12a, for example.

Figure 4:
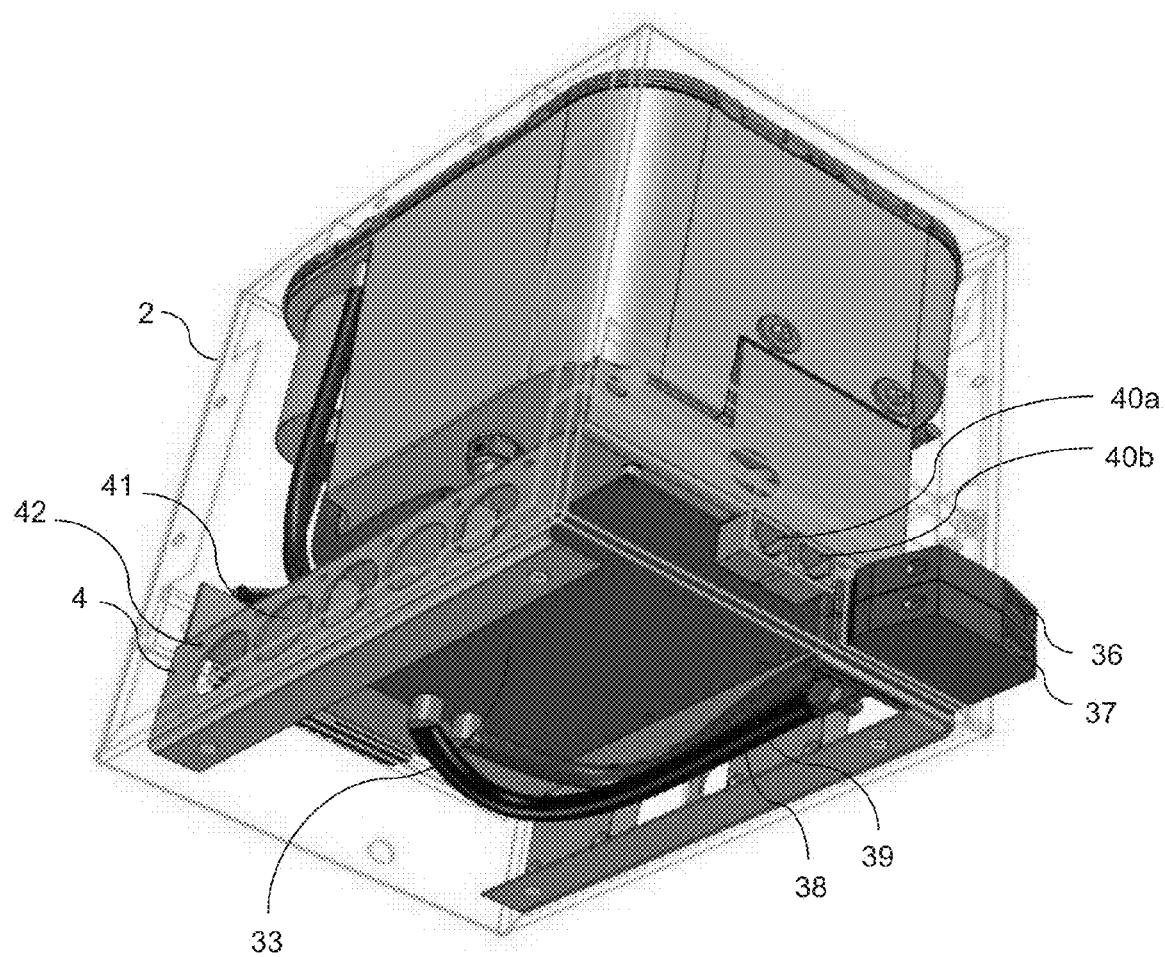
FIG. 4 is a diagram illustrating an embodiment of a sub-housing assembly, housing the control circuit and other electrical components of the portable hydrogen supplemental system, according to the present invention.

In FIG. 4, a main power board 33 is disposed beneath the electrolyzer 5 in the separate sub-housing assembly 4, for example, of the system 1 and configured to supply power to the system 1 using power received via power terminals 36 and 37 connected to the main power board 33 via negative and positive electrical wiring 38 and 39. Additional connectors 40a and 40b are provided for connecting other electrical components of the system 1 thereto (e.g., an on-board diagnostic (OBD) interface). Further, power terminals 36 and 37 are connected to a vehicle battery for supplying power to the system 1. The sub-housing assembly 4 includes through-holes 41 for dissipating heat and cooling components of the main power board 33. An optional heat sink may also be provided on the main power board 33 for dissipating heat and cooling components of the main power board 33. Optional support holes 42 are also provided and configured to receive fastening units (e.g., screws) therein for fastening the sub-housing assembly 4 to the housing unit 2 (i.e., the main housing unit).

Referring back to FIG. 1, the electrolyzer 5 is operated in reverse of a fuel cell (which is commonly known to produce electricity) to produce hydrogen and oxygen gases. Thus, the electrolyzer 5 essentially operates to decompose nonelectrolyte water 9 into hydrogen gas and oxygen gas and is hereinafter referred to as an electrolyzer 5. Nonelectrolyte water 9 fills the electrolyzer 5 from the nonelectrolyte water tank 6 and when a voltage, having positive and negative terminals, is placed across the electrolyzer 5 supplied from the main power board 33, hydrogen and oxygen gases are produced, at different outlets of the electrolyzer 5.

Referring to FIG. 3, during operation of the electrolyzer 5, an oxygen gas and water mixture is generated in the electrolyzer 5 and released from the oxygen gas outlet fitting 29, through the supply means 30 and into the nonelectrolyte water tank 6 by way of tank fitting 30a. Further, hydrogen gas is generated in the electrolyzer 5 and supplied to the hydrogen gas collector 25. A small amount of nonelectrolyte water 9 will exit from the hydrogen gas outlet fitting 22 as the hydrogen gas is produced. The hydrogen gas collector 25 is configured to collect the hydrogen gas and the nonelectrolyte water 9 outputted from the electrolyzer 5. Since the oxygen gas and water mixture is released through the supply means 30 into the nonelectrolyte water tank 6, any nonelectrolyte water 9 of the oxygen gas and water mixture is returned back to the nonelectrolyte water tank 6. Further, any nonelectrolyte water 9 exiting from the hydrogen gas outlet fitting 22 with the hydrogen gas collected in the hydrogen gas collector 25 is returned to the nonelectrolyte water tank 6 via a water return port 44 of the tank 6, for returning the nonelectrolyte water 9 by a tube or other supply means 45 and a water tank fitting 46, to the nonelectrolyte water tank 6 for water preservation. The nonelectrolyte water 9 that comes out of the hydrogen outlet fitting 22 and the oxygen outlet fitting 29 during hydrogen and oxygen production is therefore maintained in the nonelectrolyte water tank 6. Additional details regarding the hydrogen gas collector 25 will be discussed below with reference to FIGS. 7 and 8A-8D. Based on the configuration of the system 1, the hydrogen gas and the oxygen gas generated in the electrolyzer 5 travel in different directions and are therefore kept separate from each other.

According to the invention the electrolyzer 5 can, for example, be a proton exchange membrane or polymer electrolyte membrane (PEM) electrolyzer. A PEM electrolyzer includes a semipermeable membrane generally made from ionomers and designed to conduct protons while being impermeable to gases such as oxygen or hydrogen. This is their essential function when incorporated into a membrane electrode assembly (MEA) of a proton exchange membrane electrolyzer or of a proton exchange membrane electrolyzer: separation of reactants and transport of protons.

As known, an electrolyzer is a device that generates hydrogen and oxygen from water through the application of electricity and includes a series of plates through which water flows while low voltage direct current is applied. Electrolyzers split the water into hydrogen and oxygen gases by the passage of electricity, normally by breaking down compounds into elements or simpler products.

Figure 5:
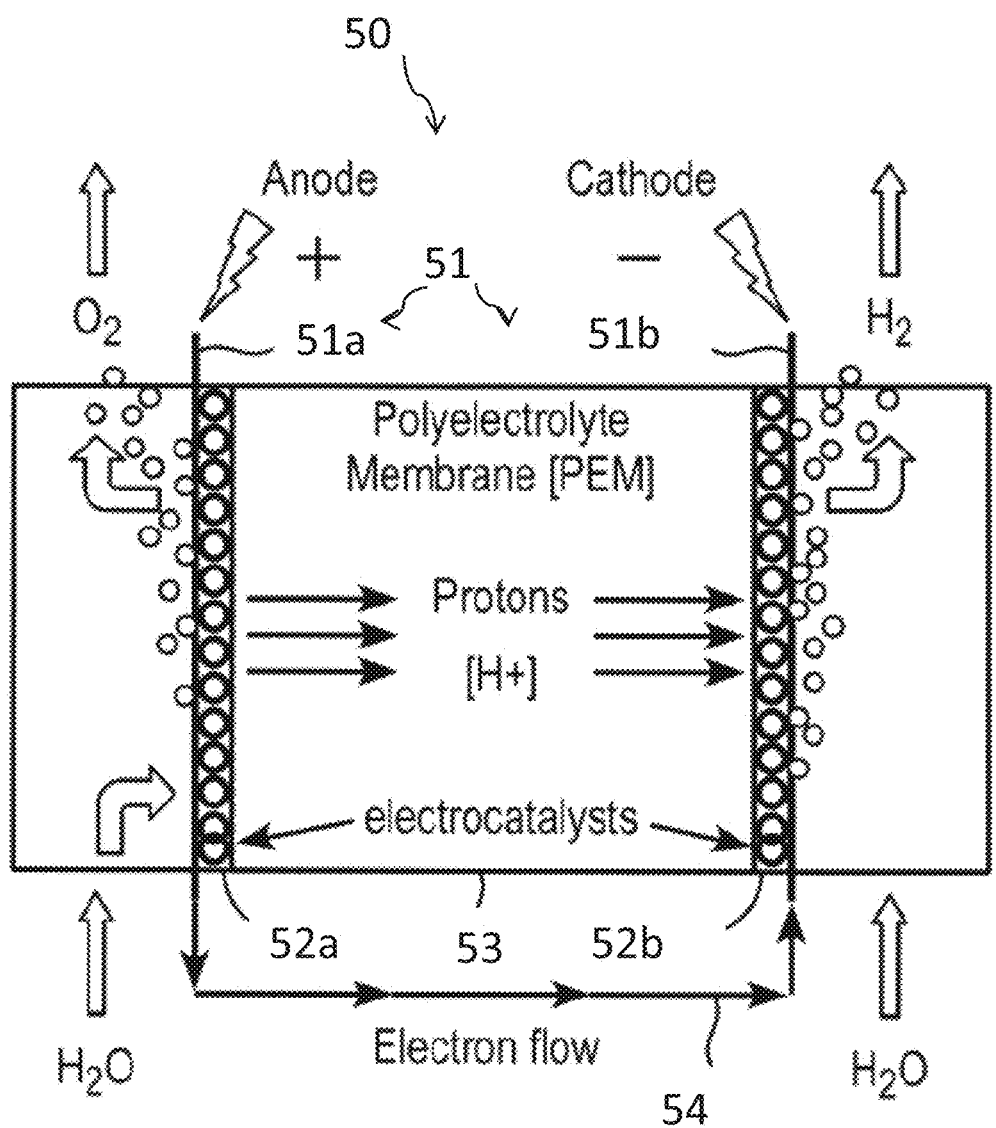
FIG. 5 is a diagram illustrating the operation and details of a PEM electrolyzer according to the present invention.

A PEM electrolyzer 50 is shown in FIG. 5. The PEM electrolyzer 50 includes a plurality of layers which are non-liquid layers including at least two external layers and an internal layer, including external electrodes 51 disposed opposite to each other one of which is the anode 51a and the other of which is the cathode 51b, electrocatalysts 52a and 52b disposed respectively on the anode 51a and the cathode 51b, and a membrane 53 disposed between the electrocatalysts 52a and 52b. The PEM electrolyzer 50 further includes an external circuit 54 which applies electrical power to the anode 51a and the cathode 51b in a manner such that electrical power in the form of electrons flow from the anode 51a, along the external circuit 54, to the cathode 51b and protons are caused to flow through the membrane 53 from the anode 51a to the cathode 51b.

The efficiency of a PEM electrolyzer 50 is a function primarily of its membrane and electro-catalyst performance. The membrane 53 includes a solid fluoropolymer which has been chemically altered in part to contain sulphonic acid groups, $SO_3H$, which easily release their hydrogen as positively-charged atoms or protons $H^+$:$SO_3H \rightarrow SO_3^- + H^+$ These ionic or charged forms allow water to penetrate into the membrane structure but not the product gases, namely molecular hydrogen $H_2$ and oxygen $O_2$. The resulting hydrated proton, $H_3O^+$, is free to move whereas the sulphonate ion $SO_3^-$ remains fixed to the polymer side-chain. Thus, when an electric field is applied across the membrane 53 the hydrated protons are attracted to the negatively charged electrode, known as the cathode 51b. Since a moving charge is identical with electric current, the membrane 53 acts as a conductor of electricity. It is said to be a protonic conductor.

A typical membrane material that is used is called "nafion." Nafion is a perfluorinated polymer that contains small proportions of sulfonic or carboxylic ionic functional groups.

Accordingly, as shown in FIG. 5, nonelectrolyte water 9 enters the electrolyzer 5 and is split at the surface of the membrane 53 to form protons, electrons and gaseous oxygen. The gaseous oxygen leaves the electrolyzer 5 while the protons move through the membrane 53 under the influence of the applied electric field and electrons move through the external circuit 54. The protons and electrons combine at the opposite surface, namely the negatively charged electrode, known as the cathode 53b, to form pure gaseous hydrogen.

Figure 6A:
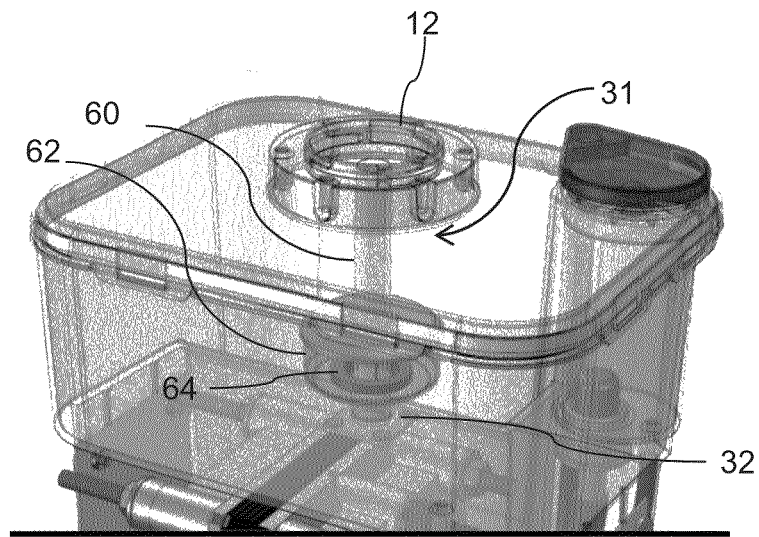
FIGS. 6A-B are diagrams of an embodiment of a float assembly of a water tank of the portable hydrogen supplemental system, according to the present invention.
Figure 6B:
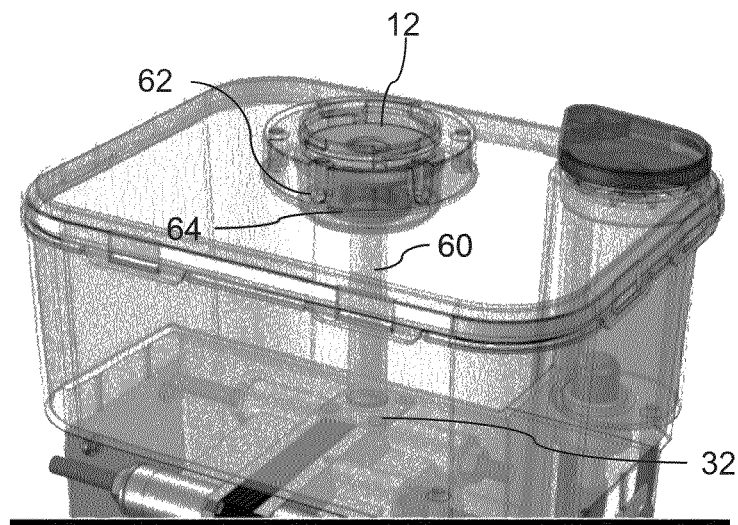

As shown in FIGS. 6A and 6B, an embodiment of the float assembly 31 includes a shaft 60 and a holding portion 62 housing a magnet 64. In FIG. 6A, as a water level of the nonelectrolyte water tank 6 decreases the holding portion 62 housing the magnet 64 travels along the shaft 60 in a downward direction as indicated by the arrow "A" and rests at a bottom portion of the nonelectrolyte water tank 6 when the tank 6 is completely empty. When the holding portion 62 is at or near a rest position on the shaft 60, a magnetic field produced by the magnet 64 is sensed by the water sensor 32 disposed beneath the nonelectrolyte water tank 6, to indicate that the water level is low. In FIG. 6B, as the nonelectrolyte water tank 6 is filled with the nonelectrolyte water 9 from the external water source, the holding unit 62 floats in an upward direction along the shaft 60, as indicated by the arrow "B." When the nonelectrolyte water tank 6 is completely filled, the holding portion 62 of the float assembly 31 rests at a top surface of the nonelectrolyte water tank 6, inside of the fill spout 12.

Figure 7:
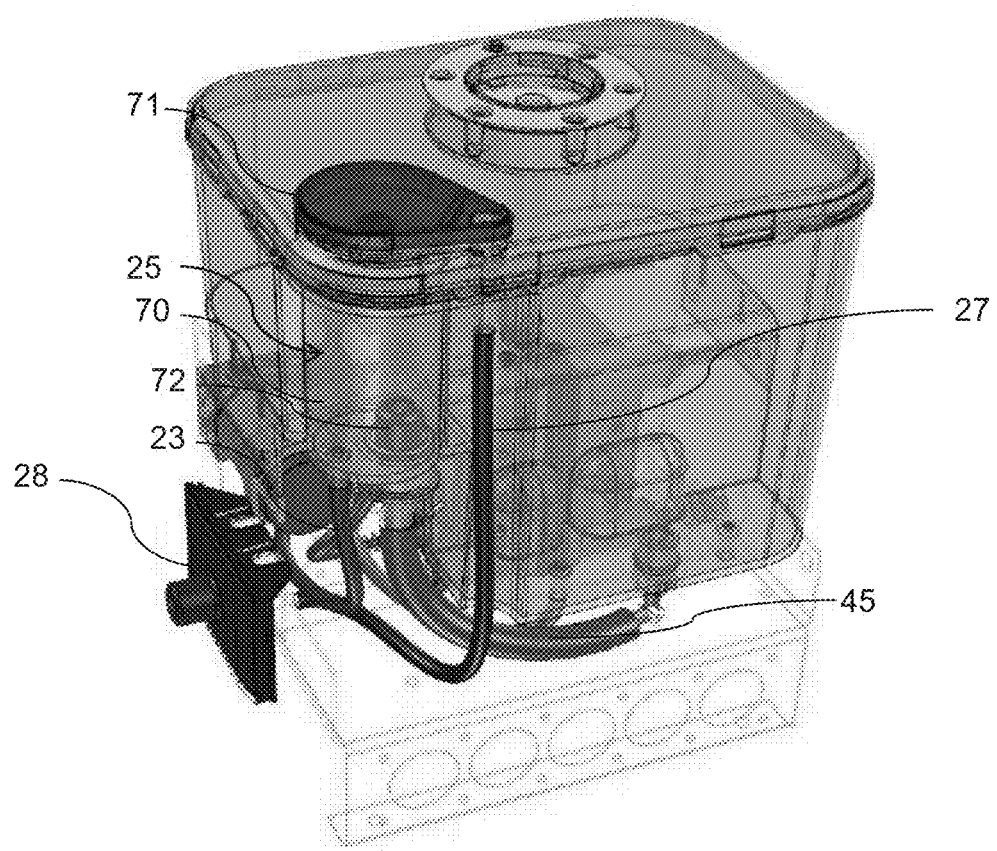
FIG. 7 is a diagram illustrating a view of the portable hydrogen supplemental system showing an embodiment of a hydrogen gas collector, according to the present invention.

FIGS. 7 and 8A-D are diagrams illustrating the operation and details of the hydrogen gas collector 25 according to embodiments of the present invention. As shown in FIG. 7, the hydrogen gas collector 25 includes a hydrogen gas collection portion 70, a cover portion 71 covering a top opening of the hydrogen gas collection portion 70, a float valve 72 stored within the hydrogen gas collection portion 70.

Figure 8A:
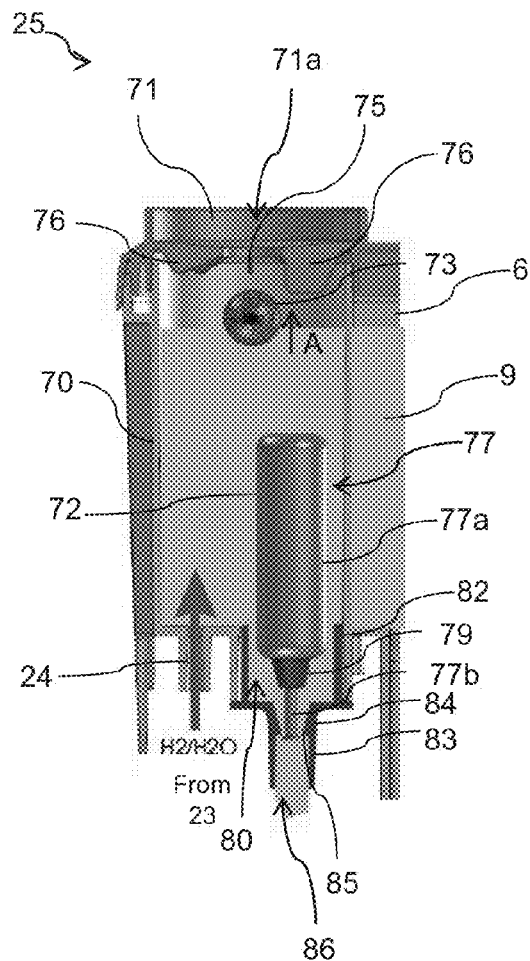
FIGS. 8A-D are diagrams illustrating the operation and details of the hydrogen gas collector of FIG. 7, according to the present invention.

Further, as shown in FIG. 8A, the hydrogen gas collector 25 further comprises a ball seal 73 stored within the hydrogen gas collection portion 70. The cover portion 71 comprises a center region 71a along an interior surface thereof, housing a protrusion portion 75 extending in a downward direction within the hydrogen gas collection portion 70. The protrusion portion 75 is configured to receive the ball seal 73 during operation of the hydrogen gas collector 25. The cover portion 71 further comprises flange portions 76 spaced a predetermined distance apart along the interior surface of the cover portion 71 and surrounding the protrusion portion 75 at the center region 71a thereof to direct the ball seal 73 to the center region 71a during normal operation of the hydrogen gas collector 25. The ball seal 73 may be formed of a polystyrene foam material, for example.

The float valve 72 comprises a valve body 77 having a top portion 77a and a lower portion 77b. A stopper 79 surrounds a side surface of the bottom portion 77b. According to one or more embodiments the float valve 72 may be formed of a plastic material and the stopper 79 may be formed of an elastomer material. The present invention is not limited to any particular type of material and may vary accordingly. The hydrogen gas collection portion 70 includes a valve receiving portion 80 for receiving the float valve 72. The valve receiving portion 80 includes a first receiving section 82 at a top thereof and a second receiving section 83 formed of a through-hole 84 at a bottom thereof. Flange portions 85 are formed between the first receiving section 82 and the second receiving section 83, and a return outlet 86 which is formed in the water return port 44 of the nonelectrolyte water tank 6. The top portion 77a of the float valve 72 is disposed within the first receiving section 82 and the bottom portion 77b of the float valve 72 is disposed within the through-hole 84 of the second receiving section 83.

According to one or more embodiments, the hydrogen gas collection portion 70 is configured to receive the hydrogen gas and the small amount of nonelectrolyte water 9 from the electrolyzer 5 via the tubes or additional supply means 23 and the fitting 24 (as depicted in FIG. 2).

During normal operation of the hydrogen gas collector 25, as the hydrogen gas collector portion 70 fills with the hydrogen gas and nonelectrolyte water 9, the nonelectrolyte water 9 therein returns to the nonelectrolyte water tank 6 via the tube or other supply means 45 connected with the water return port 44, for water preservation. As shown in FIG. 8A, the ball seal 73 floats as indicated by arrow "A" to a top of the hydrogen gas collection portion 70 as the hydrogen gas collection portion 70 is being filled with the nonelectrolyte water 9 or severe movements of the vehicle jossels the nonelectrolyte water 9 towards the top of the hydrogen gas collection portion 70 of the hydrogen gas collector 25.

Figure 8B:
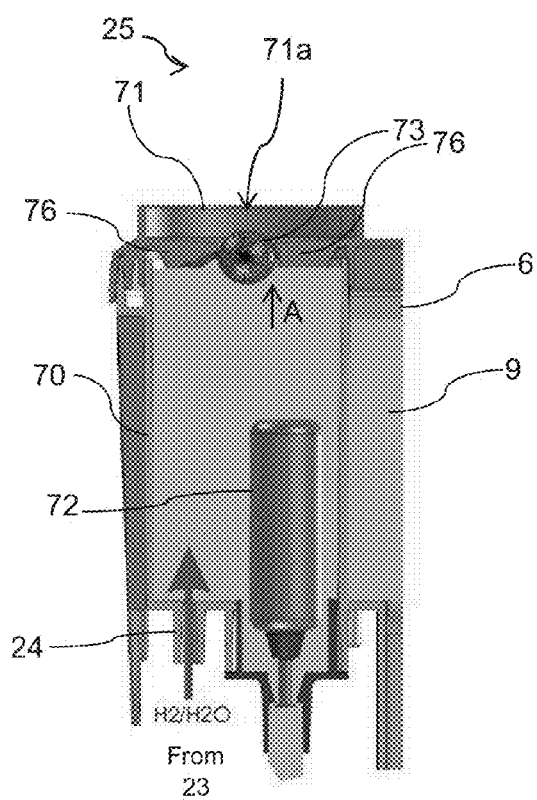

As shown in FIG. 8B, in the case of overfill of the hydrogen gas collection portion 70, the ball seal 73 is guided by the flange portions 76 to the center region 71a, and is secured on the protrusion portion 75 formed in the center region 71a and rests within the center region 71a of the cover portion 71.

Figure 8C:
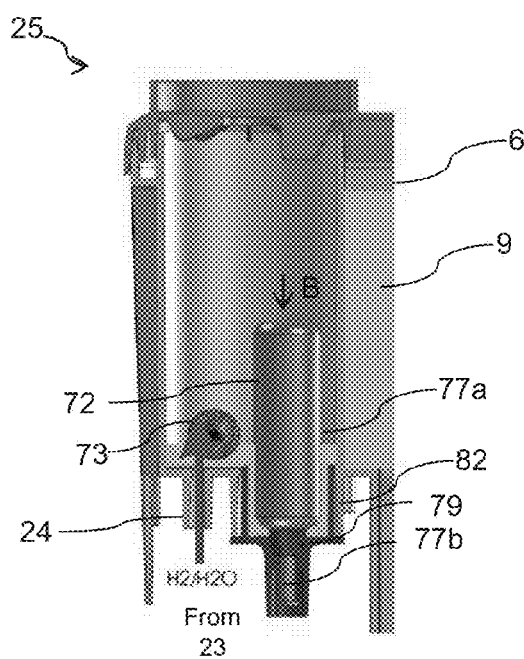

As shown in FIG. 8C, when the hydrogen gas collected within the hydrogen gas collection portion 70 is overpressure and the water level in the hydrogen gas collection portion 70 is low, the float valve 72 moves in a downward direction as indicated by arrow "B" and the stopper 79 prevents the hydrogen gas from flowing to the nonelectrolyte water tank 6 via the through-hole 86. Further, the ball seal 73 does not float upward towards the cover portion 71.

Figure 8D:
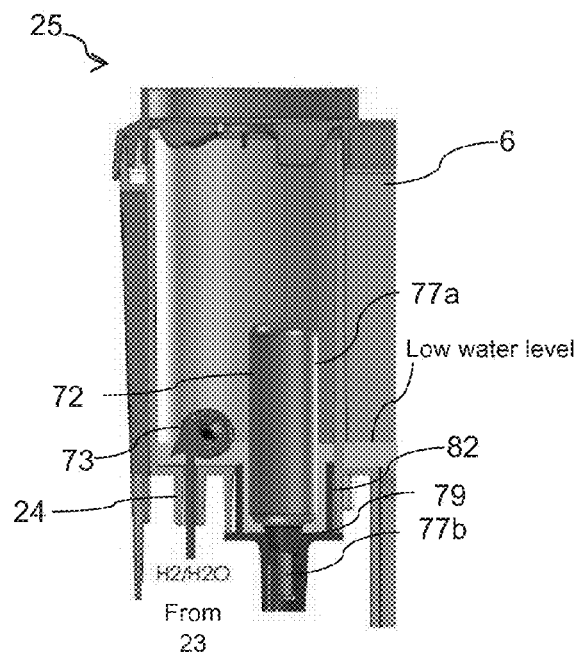

As shown in FIG. 8D, when the nonelectrolyte water 9 of the nonelectrolyte water tank 6 is of a low level causing the float assembly 31 to move downward on the shaft 60, the water level sensor 32 is triggered to notify an operator of the system 1 of the low water level within the nonelectrolyte water tank 6. As the water level in the hydrogen gas collection portion 70 increases, the float valve 72 rises, and gradually floats in an upward direction as shown in FIGS. 8A and 8B, to release the nonelectrolyte water 9 in a downward direction back to the nonelectrolyte water tank 6. Further, the hydrogen gas is released in an upward direction towards the hydrogen fitting 26 (as depicted in FIG. 2) and to the hydrogen outlet 28 via the supply means or other tubing 27. The hydrogen gas $H_2$ then travels to the internal combustion engine for use during a combustion process thereof.

Figure 9:
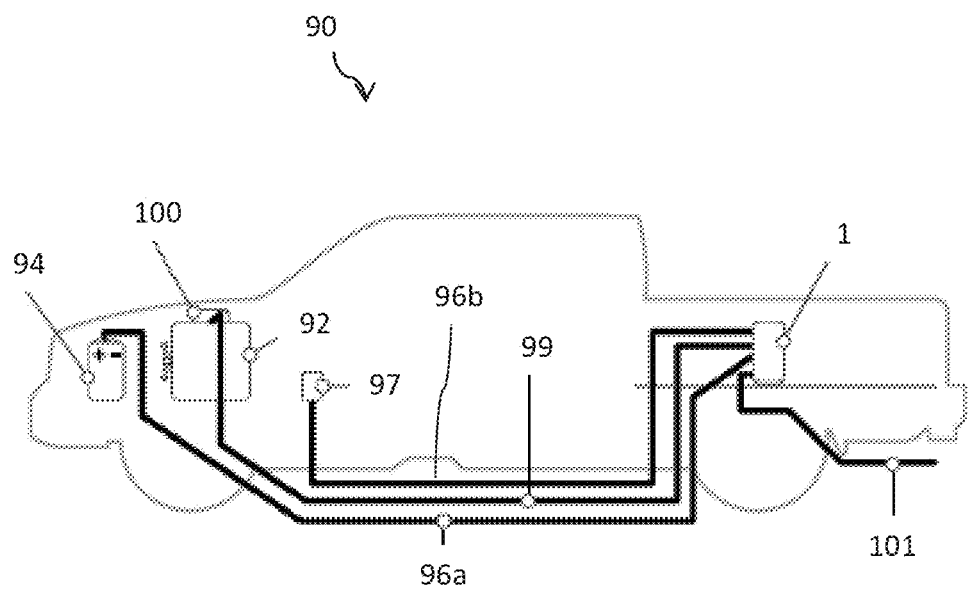
FIG. 9 is a schematic showing a portable hydrogen supplemental system installed in a typical vehicle according to the present invention.

As shown in FIG. 9, a vehicle 90 powered by an engine (e.g., a diesel engine) 92 is equipped with the portable hydrogen supplemental system 1. Power is supplied to the portable hydrogen supplemental system 1 by a vehicle battery 94 connected to electrical wires 96a. The electrical circuit to the portable hydrogen supplemental system 1 includes an on-board diagnostic (OBD) interface 97 in communication with the engine 92 via a vehicle OBD terminal 98 (as depicted in FIG. 11), and in communication with the main power board 33 of the system 1 via electrical wires 96b. The OBD interface 97 completes the electrical circuit to the portable hydrogen supplemental system 1 when the engine 92 is running (e.g., based on the rotational speed of the engine 92). The vehicle OBD terminal 98 is used to perform self-diagnostic of the vehicle. The OBD terminal 98 enables an operator of the vehicle 90 to access to state of health information for various vehicle sub-systems. Once power is supplied to the portable hydrogen supplemental system 1, hydrogen gas $H_2$ flows thru a hydrogen outlet tube 99 connected to the hydrogen outlet 28 of the housing unit 2 to an air intake 100 of the vehicle's engine 92 and traveling into a combustion chamber 102 as shown in FIG. 10.

Figure 10:
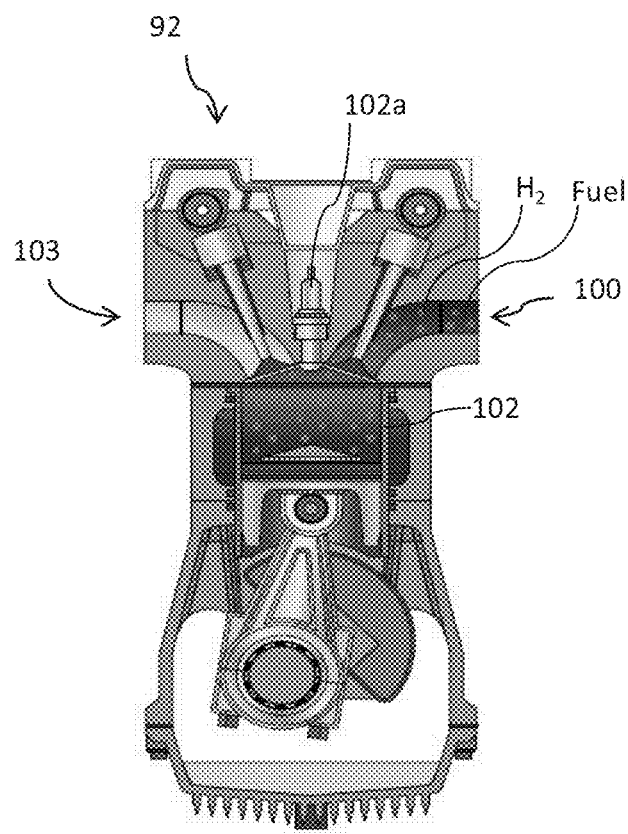
FIG. 10 is a diagram of an embodiment of an internal combustion engine receiving hydrogen from the portable hydrogen supplemental system, according to the present invention.
Figure 11:
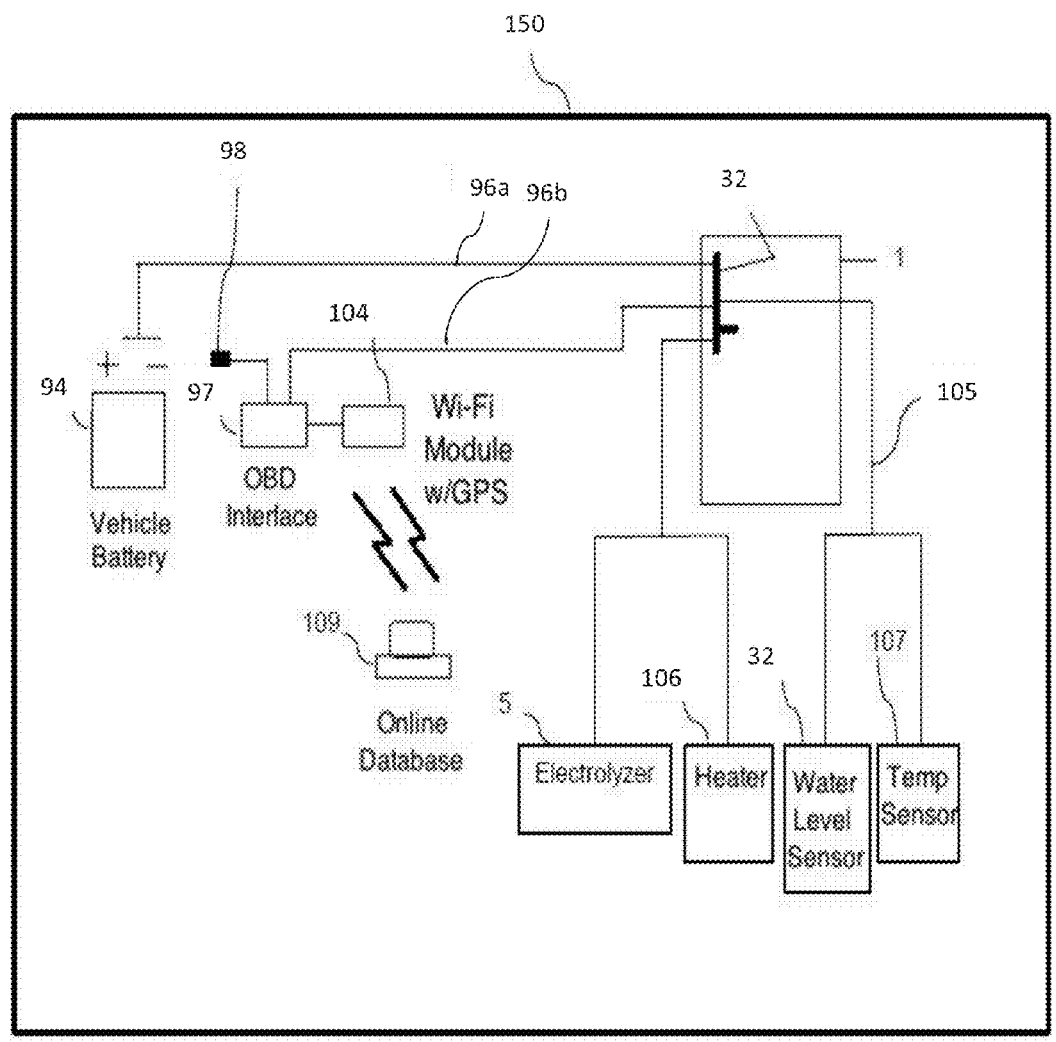
FIG. 11 is a diagram of an embodiment of a control circuit of the present invention.

FIG. 10 shows the combustion chamber 102 for a gasoline engine, which includes a spark plug 102a. However, the same principle applies to a diesel engine, which uses compression to ignite the fuel instead of the spark from the spark plug 102a. In both cases, the hydrogen gas $H_2$ travels into the combustion chamber 102 of the engine 92 and assists with the combustion of fuel therein. Since hydrogen $H_2$ burns at a faster rate than most fuels, including gasoline and diesel, a larger percentage of the fuel in the combustion chamber 102 is burned because of the presence of the hydrogen $H_2$ prior to being exhausted from the combustion chamber 102. The exhaust is then release through an exhaust outlet 103 after the fuel is burned. Since the hydrogen gas $H_2$ assisted with burning more of the fuel in the combustion chamber 102, the amount of particulate matter (and other unburned hydrocarbons) exiting the combustion chamber 102 and entering the exhaust outlet 103 is reduced.

In some embodiments, oxygen gas $O_2$ (as depicted in FIG. 5) is returned to the nonelectrolyte water tank 6 via the oxygen outlet fitting 29 of the electrolyzer 5 and a supply means or other tubing 30 to tank fitting 30a as shown in FIG. 3. Optionally, the oxygen gas may be released into the atmosphere via the oxygen outlet 101, after returning to the nonelectrolyte water tank 6. The oxygen gas may then be returned back into the atmosphere. According to one or more other embodiments, the two gasses can optionally be combined for diesel engine vehicles or other internal combustion engines without oxygen sensors, if desired.

The electrical circuit can, for example, be provided by a control circuit 150 as illustrated in FIG. 11 for controlling the system 1. The control circuit 150 includes the OBD interface 97 in communication with the vehicle OBD terminal 98 and the main power board 33. The vehicle battery 94 is connected with the power terminals 36 and 37 at the main power board 33. The control circuit 150 further includes a communication module 104 equipped with a global positioning system (GPS). According to one or more embodiments, the communication module 104 is a wireless module for wirelessly transmitting vehicle information via the OBD interface 97. The OBD interface 97 is configured to receive at least one or more data output of the OBD terminal 98, such as rotational speed (RPM) information, speed information, gas usage information, etc. When it is detected that the vehicle 90 is running, the OBD interface 97 sends a signal via the wire 96b to the main control board 33, to operate the system 1. For example, when the rotational speed of the engine 92 exceeds a predetermined level, a positive output is sent to the main power board 33, thereby causing the electrolyzer 5 to operate when the engine 92 is running. The hydrogen gas may be generated based on the vehicle speed or a predetermined RPM of the engine or a combination of other outputs from the OBD terminal 98 such that the electrolyzer 5 is activated to generate hydrogen gas.

Other components of the system 1 are also connected with the main power board 33 via wires 105. The other components include the electrolyzer 5, the water level sensor 32, a heater 106, and a temperature sensor 107.

According to one or more embodiments of the present invention, the OBD interface 97 is in communication with a database 109 (e.g., a web-based database), via the communication module 104, for receiving vehicle information and system information including status information. The status information may include, for example, water level information from the water level sensor 32 and temperature sensor information from the temperature sensor 107. The database 109 may further store historical data collected over time to be used to control operation or regulate maintenance of the system 1. For example, necessary re-filling of the nonelectrolyte water tank 6 may be determined based on the status information of the water level within the nonelectrolyte water tank 6.

According to alternative embodiments, in a gasoline or diesel powered engine the electrical power used by the portable hydrogen supplemental system 1 is supplied by the engine alternator. As described above the electrical power is only supplied when the engine is operating and/or a combination of data output from the OBD terminal 98 exceeds a predetermined level. Thus, the load placed on the engine by the portable hydrogen supplemental system 1 is related to the amount of electrical power drawn from the alternator as measured in amps.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A portable hydrogen supplemental system for supplying hydrogen gas to an internal combustion engine comprising:
    a housing unit configured for mounting in a vehicle;
    an electrolyzer mounted inside the housing unit that separates nonelectrolyte water into hydrogen and oxygen gas in response to electrical power;
    a nonelectrolyte water tank mounted inside the housing unit and positioned to supply nonelectrolyte water to the electrolyzer;
    an onboard diagnostic interface for interfacing with an onboard diagnostic terminal of the vehicle, for detecting operation of the internal combustion engine;
    a power supply for supplying the electrical power in the form of a voltage to the electrolyzer according to the detected operation of the internal combustion engine;
    a hydrogen gas collector mounted inside the housing unit for collecting the hydrogen gas from the electrolyzer,
    wherein the electrolyzer, when supplied with electrical power produces the hydrogen and oxygen gasses from the nonelectrolyte water being supplied from the nonelectrolyte water tank via a supply line connected thereto, and causes the hydrogen gas collector to supply hydrogen gas directly into the internal combustion engine for combustion therein,
    wherein the electrolyzer is disposed external of the nonelectrolyte water tank,
    wherein the oxygen gas supplied from the electrolyzer travels back to the nonelectrolyte water tank;
    wherein said electrolyzer comprises:
    a plurality of layers, said layers being non-liquid and each layer being in adjacent contact with another one of said layers,
    wherein the plurality of layers includes at least two external layers and an internal layer which is disposed in adjacent contact between the external layers,
    wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer, and wherein the hydrogen gas is supplied directly into an air intake of the internal combustion engine and travels into a combustion chamber of the internal combustion engine to assist with burning of fuel within the combustion chamber.

2. The portable hydrogen supplemental system according to claim 1, further comprising:
a fill spout supplying the nonelectrolyte water to the nonelectrolyte water tank;
a float assembly connected with the fill spout and housed within the nonelectrolyte water tank, and configured to perform a floating operation indicative of a level of the nonelectrolyte water within the nonelectrolyte water tank; and
a water level sensor disposed at a bottom surface of the nonelectrolyte water tank and configured to magnetically communicate with the float assembly, to determine the level of the nonelectrolyte water based on a position of the float assembly.

3. The portable hydrogen supplemental system according to claim 2, wherein the float assembly comprises:
a shaft extending from the fill spout in a downward direction;
a holding portion connected with the shaft and housing a magnet therein,
wherein the magnet is in communication with the water level sensor when the float assembly is positioned at rest at a bottom of the nonelectrolyte water tank to indicate that the level of the nonelectrolyte water is low, and
wherein the holding portion floating along the shaft, in an upward direction towards the fill spout as the nonelectrolyte water tank is filled with the nonelectrolyte water to indicate that the level of the nonelectrolyte water is increasing, and when the nonelectrolyte water tank is filled with the nonelectrolyte water, the holding portion of the float assembly rests at a top surface of the nonelectrolyte water tank inside the fill spout, closing the fill spout.

4. The portable hydrogen supplemental system according to claim 1, wherein the hydrogen gas collector comprises:
a hydrogen gas collection portion for receiving the hydrogen gas and an amount of the nonelectrolyte water, from the electrolyzer therein; and
a float valve disposed in communication with the hydrogen gas collection portion, for receiving the nonelectrolyte water therein to be returned to the nonelectrolyte water tank.

5. The portable hydrogen supplemental system according to claim 4, wherein the hydrogen gas collector further comprises:
a cover portion covering a top opening of the hydrogen gas collection portion and comprising:
a protrusion portion disposed at a center region along an interior surface the cover portion and extending in a downward direction within the hydrogen gas collection portion; and
a plurality of flange portions spaced a predetermined distance apart along the interior surface of the cover portion and surrounding the protrusion portion at the center region; and
a ball seal stored therein and configured to seal the top opening of the hydrogen gas collection portion,
wherein during operation of the hydrogen gas collector, as the hydrogen gas collection portion is filled with the hydrogen gas and nonelectrolyte water, the ball seal floats toward the top opening of the hydrogen gas collection portion and the plurality of flanges direct the ball seal to the protrusion portion to be positioned and seals the top opening of the hydrogen gas collection portion.

6. The portable hydrogen supplemental system according to claim 4, wherein the hydrogen gas collection portion comprises:
a valve receiving portion including a first receiving section and a second receiving section formed of a through-hole at a bottom thereof; and
a return outlet provided to be connected with the nonelectrolyte water tank;
the float valve including a top portion disposed within the first receiving section;
and a bottom portion disposed within the through-hole of the second receiving section, and configured to float as the hydrogen gas and the nonelectrolyte water fills the hydrogen gas collection portion.

7. The portable hydrogen supplemental system according to claim 6, wherein the hydrogen gas collector collects the hydrogen gas, the nonelectrolyte water traveling with the hydrogen gas is circulated to the valve receiving portion, to be returned to the nonelectrolyte water tank.

8. The portable hydrogen supplemental system according to claim 7, further comprising:
a stopper disposed on a side surface of the float valve, and configured to block the hydrogen gas from returning to the nonelectrolyte water tank.

9. The portable hydrogen supplemental system according to claim 1, wherein the onboard diagnostic interface is in communication with the engine via the onboard diagnostic terminal and in communication with the power supply of the system, and controls power to be supplied to the power supply through a control signal transmitted to the power supply.

10. The portable hydrogen supplemental system according to claim 9, further comprising:
a communication module for transmitting vehicle information via the onboard diagnostic terminal to the power supply via a communication network.

11. The portable hydrogen supplemental system according to claim 10, wherein the communication module is a wireless module for wirelessly receiving and transmitting vehicle information.

12. The portable hydrogen supplemental system according to claim 11, wherein the onboard diagnostic interface is configured to receive at least one of rotational speed information, speed information, or gas usage information.

13. The portable hydrogen supplemental system according to claim 1, further comprising:
a temperature sensor mounted within the housing and configured to sense a temperature of the nonelectrolyte water to be supplied to the electrolyzer;
a heater mounted within the housing and configured to heat the nonelectrolyte water to be supplied to the electrolyzer when the nonelectrolyte water is above a predetermined temperature.

14. The portable hydrogen supplemental system according to claim 1, further comprising:

a pump connected between the nonelectrolyte water tank and the electrolyzer, and configured to pump the nonelectrolyte water into the electrolyzer.

15. The portable hydrogen supplemental system according to claim 1, further comprising:
a control circuit disposed within a sub-housing assembly and configured for controlling operation of the portable hydrogen supplemental system, and
wherein the sub-housing assembly is mounted within the housing unit and comprises a plurality of through-holes for dissipating heat and cooling components of the control circuit, and wherein the sub-housing assembly is disposed beneath the electrolyzer.

16. A method of supplying hydrogen gas to an internal combustion engine of a vehicle, comprising:
supplying, from a nonelectrolyte water tank mounted inside a housing unit mounted within the vehicle, nonelectrolyte water to an electrolyzer;
detecting, by an onboard diagnostic interface in communication with a vehicle onboard diagnostic terminal, operation of the internal combustion engine;
supplying, by a power supply, electrical power in the form of a voltage to the electrolyzer according to the detected operation of the internal combustion engine;
producing, by the electrolyzer when supplied with the electrical power, hydrogen and oxygen gases from the nonelectrolyte water from the nonelectrolyte water tank;
supplying, via a hydrogen gas collector, the hydrogen gas directly to the internal combustion engine for combustion therein,
wherein the electrolyzer, when supplied with electrical power produces the hydrogen and oxygen gasses from the nonelectrolyte water being supplied from the nonelectrolyte water tank via a supply line connected thereto, and causes the hydrogen gas collector to supply hydrogen gas directly into the internal combustion engine for combustion therein,
wherein the electrolyzer is disposed external of the nonelectrolyte water tank,
wherein the oxygen gas supplied from the electrolyzer travels back to the nonelectrolyte water tank;
wherein said electrolyzer comprises:
a plurality of layers, said layers being non-liquid and each layer being in adjacent contact with another one of said layers,
wherein the plurality of layers includes at least two external layers and an internal layer which is disposed in adjacent contact between the external layers,
wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer,
wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer, and
wherein the hydrogen gas is supplied directly into an air intake of the internal combustion engine and travels into a combustion chamber of the internal combustion engine to assist with burning of fuel within the combustion chamber.

17. The method according to claim 16, further comprising:
supplying the nonelectrolyte water to the nonelectrolye water tank;
performing, via a float assembly, a floating operation indicative of a level of the nonelectrolyte water within the nonelectrolyte water tank; and
sensing, via a water level sensor disposed at a bottom surface of the nonelectrolyte water tank, a level of the nonelectrolyte water by magnetically communicating with the float assembly.

18. The method according to claim 17, further comprising:
magnetically communicating, via a magnet within a holding portion of a float assembly in the nonelectrolyte water tank, with the water level sensor;
wherein the float assembly is positioned at rest at a bottom of the nonelectrolyte water tank to indicate that the level of the nonelectrolyte water is low, and
wherein the holding portion floating along the shaft, in an upward direction towards the fill spout as the nonelectrolyte water tank is filled with the nonelectrolyte water to indicate that the level of the nonelectrolyte water is increasing, and when the nonelectrolyte water tank is filled with the nonelectrolyte water, the holding portion of the float assembly rests at a top surface of the nonelectrolyte water tank inside the fill spout, closing the fill spout.

19. The method according to claim 16, further comprising:
receiving, via the hydrogen gas collector, the hydrogen gas and an amount of the nonelectrolyte water, from the electrolyzer, therein; and
returning, via a float valve within the hydrogen gas collector, the amount of nonelectrolyte water to the nonelectrolyte water tank.

20. The method according to claim 16, further comprising:
controlling the power supply via the onboard diagnostic interface in communication with the engine; and a communication module for transmitting vehicle information via the onboard diagnostic terminal to the power supply via a communication network.

21. The method according to claim 20, wherein the onboard diagnostic interface is configured to receive at least one of rotational speed information, speed information, or gas usage information.

22. A portable hydrogen supplemental system for supplying hydrogen gas to an internal combustion engine comprising:
a housing unit configured for mounting in a vehicle;
an electrolyzer mounted inside the housing unit that separates nonelectrolyte water into hydrogen and oxygen gas in response to electrical power;
a nonelectrolyte water tank mounted inside the housing unit and positioned to supply nonelectrolyte water to the electrolyzer;
an onboard diagnostic interface for interfacing with an onboard diagnostic terminal of the vehicle, for detecting operation of the internal combustion engine;
a power supply for supplying the electrical power in the form of a voltage to the electrolyzer according to the detected operation of the internal combustion engine;

a hydrogen gas collector mounted inside the housing unit for collecting the hydrogen gas from the electrolyzer, wherein the electrolyzer, when supplied with electrical power produces the hydrogen and oxygen gasses from the nonelectrolyte water being supplied from the nonelectrolyte water tank via a supply line connected thereto, and causes the hydrogen gas collector to supply hydrogen gas directly into the internal combustion engine for combustion therein, wherein the electrolyzer is disposed external of the nonelectrolyte water tank, wherein the oxygen gas supplied from the electrolyzer travels back to the nonelectrolyte water tank;

wherein said electrolyzer comprises:

a plurality of layers, said layers being non-liquid and each layer being in adjacent contact with another one of said layers, wherein the plurality of layers includes at least two external layers and an internal layer which is disposed in adjacent contact between the external layers, wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer, wherein the hydrogen gas is supplied directly into an air intake of the internal combustion engine and travels into a combustion chamber of the internal combustion engine to assist with burning of fuel within the combustion chamber, and wherein an amount of particulate matter exiting the combustion chamber is reduced by a predetermined amount compared to operation of the internal combustion engine not using hydrogen gas based on an amount of the hydrogen gas traveling into the combustion chamber and an amount of the fuel burned within the combustion chamber.

23. The portable hydrogen supplemental system according to claim 22, further comprising:

a fill spout supplying the nonelectrolyte water to the nonelectrolyte water tank;

a float assembly connected with the fill spout and housed within the nonelectrolyte water tank, and configured to perform a floating operation indicative of a level of the nonelectrolyte water within the nonelectrolyte water tank; and a water level sensor disposed at a bottom surface of the nonelectrolyte water tank and configured to magnetically communicate with the float assembly, to determine the level of the nonelectrolyte water based on a position of the float assembly.

24. The portable hydrogen supplemental system according to claim 23, wherein the float assembly comprises:

a shaft extending from the fill spout in a downward direction;

a holding portion connected with the shaft and housing a magnet therein, wherein the magnet is in communication with the water level sensor when the float assembly is positioned at rest at a bottom of the nonelectrolyte water tank to indicate that the level of the nonelectrolyte water is low, and wherein the holding portion floating along the shaft, in an upward direction towards the fill spout as the nonelectrolyte water tank is filled with the nonelectrolyte water to indicate that the level of the nonelectrolyte water is increasing, and when the nonelectrolyte water tank is filled with the nonelectrolyte water, the holding portion of the float assembly rests at a top surface of the nonelectrolyte water tank inside the fill spout, closing the fill spout.

25. The portable hydrogen supplemental system according to claim 22, wherein the hydrogen gas collector comprises:

a hydrogen gas collection portion for receiving the hydrogen gas and an amount of the nonelectrolyte water, from the electrolyzer therein; and a float valve disposed in communication with the hydrogen gas collection portion, for receiving the nonelectrolyte water therein to be returned to the nonelectrolyte water tank.

26. The portable hydrogen supplemental system according to claim 25, wherein the hydrogen gas collector further comprises:

a cover portion covering a top opening of the hydrogen gas collection portion and comprising:

a protrusion portion disposed at a center region along an interior surface the cover portion and extending in a downward direction within the hydrogen gas collection portion; and a plurality of flange portions spaced a predetermined distance apart along the interior surface of the cover portion and surrounding the protrusion portion at the center region; and a ball seal stored therein and configured to seal the top opening of the hydrogen gas collection portion, wherein during operation of the hydrogen gas collector, as the hydrogen gas collection portion is filled with the hydrogen gas and nonelectrolyte water, the ball seal floats toward the top opening of the hydrogen gas collection portion and the plurality of flanges direct the ball seal to the protrusion portion to be positioned and seals the top opening of the hydrogen gas collection portion.

27. The portable hydrogen supplemental system according to claim 25, wherein the hydrogen gas collection portion comprises:

a valve receiving portion including a first receiving section and a second receiving section formed of a through-hole at a bottom thereof; and a return outlet provided to be connected with the nonelectrolyte water tank;

the float valve including a top portion disposed within the first receiving section; and a bottom portion disposed within the through-hole of the second receiving section, and configured to float as the hydrogen gas and the nonelectrolyte water fills the hydrogen gas collection portion.

28. The portable hydrogen supplemental system according to claim 27, wherein the hydrogen gas collector collects the hydrogen gas, the nonelectrolyte water traveling with the hydrogen gas is circulated to the valve receiving portion, to be returned to the nonelectrolyte water tank.

29. The portable hydrogen supplemental system according to claim 28, further comprising:
a stopper disposed on a side surface of the float valve, and configured to block the hydrogen gas from returning to the nonelectrolyte water tank.

30. The portable hydrogen supplemental system according to claim 22, wherein the onboard diagnostic interface is in communication with the engine via the onboard diagnostic terminal and in communication with the power supply of the system, and controls power to be supplied to the power supply through a control signal transmitted to the power supply.

31. The portable hydrogen supplemental system according to claim 30, further comprising:
a communication module for transmitting vehicle information via the onboard diagnostic terminal to the power supply via a communication network.

32. The portable hydrogen supplemental system according to claim 31, wherein the communication module is a wireless module for wirelessly receiving and transmitting vehicle information.

33. The portable hydrogen supplemental system according to claim 32, wherein the onboard diagnostic interface is configured to receive at least one of rotational speed information, speed information, or gas usage information.

34. The portable hydrogen supplemental system according to claim 22, further comprising:
a temperature sensor mounted within the housing and configured to sense a temperature of the nonelectrolyte water to be supplied to the electrolyzer;
a heater mounted within the housing and configured to heat the nonelectrolyte water to be supplied to the electrolyzer when the nonelectrolyte water is above a predetermined temperature.

35. The portable hydrogen supplemental system according to claim 22, further comprising:
a pump connected between the nonelectrolyte water tank and the electrolyzer, and configured to pump the nonelectrolyte water into the electrolyzer.

36. The portable hydrogen supplemental system according to claim 22, further comprising:
a control circuit disposed within a sub-housing assembly and configured for controlling operation of the portable hydrogen supplemental system;
wherein the sub-housing assembly is mounted within the housing unit and comprises a plurality of through-holes for dissipating heat and cooling components of the control circuit, and wherein the sub-housing assembly is disposed beneath the electrolyzer.

* * * * *